US009725226B2

(12) United States Patent
Chen

(10) Patent No.: US 9,725,226 B2
(45) Date of Patent: Aug. 8, 2017

(54) CONTAINER

(71) Applicant: Beijing Red-Sea Tech Co., Ltd., Beijing (CN)

(72) Inventor: Zengxin Chen, Beijing (CN)

(73) Assignee: Beijing Red-Sea Tech Co., Ltd., Beijing (CN)

( * ) Notice: Subject to any disclaimer, the term of this patent is extended or adjusted under 35 U.S.C. 154(b) by 161 days.

(21) Appl. No.: 14/409,342

(22) PCT Filed: Jun. 27, 2013

(86) PCT No.: PCT/CN2013/000773
§ 371 (c)(1),
(2) Date: Dec. 18, 2014

(87) PCT Pub. No.: WO2014/000424
PCT Pub. Date: Jan. 3, 2014

(65) Prior Publication Data
US 2015/0183570 A1  Jul. 2, 2015

(30) Foreign Application Priority Data

Jun. 27, 2012 (CN) .......................... 2012 1 0214908

(51) Int. Cl.
*B65D 83/00* (2006.01)
*B65D 25/38* (2006.01)
(Continued)

(52) U.S. Cl.
CPC ......... *B65D 83/0005* (2013.01); *B65D 25/20* (2013.01); *B65D 25/28* (2013.01);
(Continued)

(58) Field of Classification Search
CPC ....... B05B 9/0816; B05B 9/0883; B05B 9/04; B05B 9/0403; B65D 25/56; B65D 83/00;
(Continued)

(56) References Cited

U.S. PATENT DOCUMENTS 1,964,866 A * 7/1934 Watson ..................... F16N 3/12
184/39
2,588,255 A * 3/1952 Larsh ....................... E03C 1/046
137/861

(Continued)

FOREIGN PATENT DOCUMENTS

CN         2367180 Y     3/2000
CN       202449415 U     9/2012
(Continued)

OTHER PUBLICATIONS

International Search Report for corresponding International Application No. PCT/CN2013/000773, mailed Oct. 10, 2013 (4 pages).

*Primary Examiner* — Paul R Durand
*Assistant Examiner* — Robert Nichols, II
(74) *Attorney, Agent, or Firm* — Osha Liang LLP

(57) ABSTRACT

A container used in daily life comprises a container main body, and a pressure channel composed of a pressure transmission channel, a removal channel and an outflow channel connected in series. The pressure channel, attached to a wall of the container main body, has one end in communication with the removal channel and the other end connectable to a pressurizing component provided externally. The pressure transmission channel transmits pressure exerted on the inside of the pressure transmission channel by the pressurizing component provided externally, via a pressure transmission medium inside the channel. A wall of the removal channel is provided with a one-way valve allowing the contents to flow into the pressure channel. The one-way valve opens at the bottom on the inside of the container main body. The outflow channel is used for flowing out the contents from the container and preventing the contents flowing back.

9 Claims, 8 Drawing Sheets

(51) Int. Cl.
  *B65D 25/20* (2006.01)
  *B65D 25/28* (2006.01)
  *B65D 25/56* (2006.01)
  *G01F 11/04* (2006.01)
  *G01F 11/02* (2006.01)
  *G01F 11/06* (2006.01)
  *G01F 15/00* (2006.01)
  *B05B 9/08* (2006.01)

(52) U.S. Cl.
  CPC ............. *B65D 25/38* (2013.01); *B65D 25/56* (2013.01); *B65D 83/00* (2013.01); *G01F 11/025* (2013.01); *G01F 11/04* (2013.01); *G01F 11/06* (2013.01); *G01F 15/005* (2013.01); *B05B 9/0816* (2013.01); *B05B 9/0883* (2013.01)

(58) Field of Classification Search
  CPC ... B65D 83/0005; G01F 11/04; G01F 11/025; G01F 11/06
  USPC .................... 222/401, 209, 250; 220/661
  See application file for complete search history.

(56) References Cited

U.S. PATENT DOCUMENTS 4,531,660 A * 7/1985 Ford, Jr. ............... B05B 7/0037
  222/207
5,984,199 A * 11/1999 Restive ................ B05B 9/0877
  239/1

FOREIGN PATENT DOCUMENTS

| | | |
|---|---|---|
| CN | 202609357 U | 12/2012 |
| CN | 202624980 U | 12/2012 |
| CN | 202728938 U | 2/2013 |
| JP | 3-156177 A | 7/1991 |

* cited by examiner

CONTAINER

This application is a National phase filing of the International Application PCT/CN2013/000773, filed on Jun. 27, 2013, which claims the benefit of Chinese Patent Application No. 201210214908.3, filed on Jun. 27, 2012. All of these applications are incorporated by reference in their entirety.

BACKGROUND

Technical Field

The present invention relates to a container used in daily life, particularly to a cheap container suitable for mass integrated production and a container from which contents in the container can be removed conveniently and rapidly.

Related Art

Nowadays, daily products of people are increasingly rich, for example, liquid and cream products such as hand sanitizer, laundry detergent, disinfectant, liquid shampoo, shower gel, toothpaste, soybean sauce, vinegar, cooking oil, liquid chemicals, cosmetics, and health care products. However, containers for containing the products, although having various shapes, have few novel structures, and have no important improvements for many years. People have taken many existing problems for granted.

For example, there is no container for implementing quantitative removal. When quantitative removal must be performed, a user always implements the quantitative removal by means of another container having scales, and sometimes uses a rough measurement method such as "2.5 bottle caps". In this way, it is not only inconvenient in operation, but also imprecise in measurement, and it further easily causes pollution or waste of a product.

For example, when contents in the container are removed by pressurizing, pressure is exerted merely by squeezing the wall of the container, inflating the container main body, or the like. The pressurizing method has the following defects: first, a large amount of air is introduced, causing pollution to the product, and second, large pressure is required to pressurize the interior of the container main body.

For example, existing plastic containers are mostly disposable, and the containers become wastes after contents are used out. Even though the containers are recycled, they are recycled as materials, and are not used as containers any longer. This causes a large amount of environmental pollution and waste.

For example, for a container implementing removal by using a pressing component, a container main body and the pressing component are produced separately and are combined together for use. The pressing component has a complicated structure, and cannot be integrally produced with the container, so that production and assembling costs of the container are high. After completion of using the container, the pressing component and the container main body are both discarded as wastes. The pressing component is combined with the container by extending deep into the container, so that the pressing component is contaminated by the contents and is hard to be recycled.

The commonly seen problems are easily ignored, and long-term concerning and innovative measures should be taken for a novel removal method.

SUMMARY

In order to solve a problem in the prior art that there is no container and utensil of which contents can be removed conveniently, the present invention provides a container including a container main body. The container further includes a pressure channel composed of a pressure transmission channel, a removal channel and an outflow channel connected in series. A main body of the pressure transmission channel is attached to a wall of the container main body and has one end in communication with the removal channel and the other end connectable to a pressurizing component provided externally. The pressure transmission channel transmits pressure exerted on the inside of the pressure transmission channel by the pressurizing component provided externally, via a pressure transmission medium inside the channel. A wall of the removal channel is provided with a one-way valve allowing the contents in the container main body to flow into the pressure channel. The one-way valve opens at the bottom on the inside of the container main body. The outflow channel is a channel that is used for the contents to flow out of the container and able to prevent the contents from flowing back.

The container has a simple structure, can be mass produced, has no extremely precise requirements of the product structure, and can reduce production costs; the container has no portions that protrude outwards too far away, thereby facilitating packing and transport. During use, when being combined with the pressurizing component provided externally, the container can implement convenient, quick and quantitative removal. The pressurizing component provided externally means that the pressurizing component is not produced or sold integrally with the container, and the pressurizing component is mounted when the container is used.

A main body of the pressure channel of the container is attached to the container main body (an outlet of the outflow channel may be excluded), and such a container does not have excessive protrusions, and is not easily damaged.

The pressurizing component provided externally has a simple structure, and can be used after simple mounting. The pressurizing component does not contact with the contents; therefore, it is pollution free, and recycle thereof is acceptable by a user.

Obviously, the pressure transmission channel in the container at least has the following functions: 1. the pressure transmission channel can transmit pressure as required, so that pressure transmission is affected by a channel shape as few as possible, and the container shape is designed more freely; 2. a start point of movement of the pressure transmission medium can be fixed, so that measurement of the volume of removed contents becomes simpler, and if a start point and a movement reference need to be set additionally during measurement of the outflow volume of the outflow channel, the structure is more complicated; 3. the pressure transmission channel may generally be located on an upper wall or a side wall of the container, so that a user can read volume scales marked on the pressure transmission channel more conveniently.

The removal channel refers to a section of the pressure channel where the one-way valve capable of being in communication with the container main body is located. The removal channel is in communication with the pressure transmission channel and the outflow channel, and can remove the contents in the container main body to the pressure channel.

The pressure channel in the container is a channel having an internal pressure changing periodically along with a removing process of the contents. During pressurized removal, pressure inside the pressure channel is increased, and the contents in the channel flow out under the pressure;

after the removal, because of the pressurizing component externally provided, negative pressure is generated in the pressure channel, so that the contents in the container main body enter the pressure channel from the removal channel; then, pressure balance is achieved, and the container is ready for the next removal.

As for the container, a horizontal position of a connection joint of the pressure transmission channel and the pressurizing component provided externally may be higher than a full-load liquid level of the contents in the container main body. Therefore, the contents are prevented from leaking from the joint during production, transportation or use.

As for the container, a main body part, attached to a side wall of the container main body, of the pressure channel may be of an inverted parabolic shape. The parabolic-shaped pressure channel facilitates smoother flow of liquid, reduction of resistance, and more convenient removal.

As for the container, an opening of the removal channel may be located at the lowest end of the inverted parabolic shape. Therefore, the last remaining contents can also be removed conveniently.

As for the container, the pressure transmission medium may be liquid. Due to incompressibility of liquid, the liquid pressure transmission medium can transmit the pressure in time, and the outflow volume of the contents can be obtained by measuring the moving volume of the pressure transmission medium.

As for the container, a piston may be disposed in the pressure transmission channel, one side of the piston is the pressure transmission medium, and the other side of the piston is the contents. The piston can move to transmit the pressure, and also can separate the pressure transmission medium from the contents, thereby preventing pollution caused by mixing. The pressure transmission medium may be water that is cheap and has good mobility, so as to prevent the contents from being wasted in the pressure transmission channel.

As for the container, the caliber of the pressure channel may be integrally consistent. The integrally consistent caliber of the pressure channel facilitates smoother flow of liquid and reduction of resistance.

As for the container, the pressure channel may have few turns with gentle angles. The pressure channel having turns with gentle angles facilitates smoother flow of the liquid, reduction of resistance, and more convenient removal.

As for the container, the removal channel may be located on a bottom wall of the container main body. Therefore, costs can be reduced, and the last remaining contents can also be removed conveniently.

As for the container, the pressure transmission channel may be located on the side wall and an upper part of the container main body. Scales on the side wall and the upper part of the container main body facilitate more convenient observation during use.

As for the container, a joint of the pressurizing component externally provided and the pressure transmission channel may be higher than the outlet of the outflow channel. Therefore, the contents are prevented from flowing out by accident during use.

As for the container, a piston may be disposed in the pressure transmission channel, one side of the piston is the pressure transmission medium, and the other side of the piston is a pressurizing medium. The piston can separate the pressurizing medium from the pressure transmission medium, and can be used as a reference of movement of the liquid medium.

As for the container, the pressure transmission channel may be transparent, and volume scales are marked on an outer wall. By observing the moving volume (or distance) of the pressure transmission medium in the pressure transmission channel, the outflow volume (or distance) of the contents is obtained.

As for the container, a part, marked with scales, of the pressure transmission channel may be located on the upper part of the container main body. The scales located at the upper part of the container main body facilitate more convenient observation of a user during use.

As for the container, the pressure channel may be located on a same plane. The pressure channel located on the same plane has few turns, thereby facilitating smoother flow of the liquid, and reduction of flow resistance.

As for the container, the pressure transmission channel may be coiled spirally on a wall of the container main body. Such a container has a longer pressure transmission channel, the unit volume of the volume scales is smaller, and quantitative removal can be performed more precisely. Such a container has a thinner pressure transmission channel, so that the pressure required for pressurization is smaller, and the removal is simpler and more convenient. Certainly, the pressure transmission channel may be located on an outer wall of the container main body, or located on an inner wall of the container main body, or located in the wall of the container main body.

As for the container, the pressure transmission channel may be arc-shaped, and located on the upper wall of the container main body. The arc-shaped pressure transmission channel may also make the pressure transmission channel be thinner and longer, so that the removal is precise, simpler, and more convenient. The pressure transmission channel located on the upper wall of the container main body facilitates more convenient reading.

In order to solve the problems in the prior art comprehensively, and meet requirements of people for a more scientific life, the present invention provides the following container on the basis of the foregoing container in combination with a pressurizing component. The container includes a container main body, and further includes a pressurizing component, and a pressure channel composed of a pressure transmission channel, a removal channel and an outflow channel connected in series. A main body of the pressure channel is attached to a wall of the container main body and has one end in communication with the removal channel and the other end connectable to the pressurizing component. The pressure transmission channel transmits pressure exerted on the inside of the pressure transmission channel by the pressurizing component, via a pressure transmission medium inside the channel. A wall of the removal channel is provided with a one-way valve allowing contents in the container main body to flow into the pressure channel. The one-way valve opens at the bottom on the inside of the container main body. The outflow channel is a channel that is used for the contents to flow out of the container and able to prevent the contents from flowing back.

The container has a simple structure, is convenient in use, and can remove the contents in the container conveniently. The container has the following advantages:

1. The container does not need to be inverted during removal, so that oxidization of or pollution to the contents caused by too much contact between the contents and air is prevented.

2. Removal can be performed by pressurizing merely with very small pressure. Because the pressurizing is exerting pressure on the inside of the pressure channel, and according to the principle of liquid pressure transmission, the required pressure is much less than the pressure exerted on the inside of the container main body.

3. The solution can reduce manufacturing costs of the container. The pressure channel is attached to the wall of the container main body, and the wall of the container main body is used, thereby reducing total material consumption. The pressure channel can meet the requirements by using the material the same as the material of the container main body, which reduces the consumption of fine materials. A manufacturing process of integrally forming the pressure channel and the container main body reduces the manufacturing costs.

4. All contents can be removed completely. The one-way valve of the removal channel opens at the bottom on the inside of the container main body, so that the last remaining contents can also be removed conveniently.

5. A joint of the pressurizing component and the pressure transmission channel is higher than a liquid level of the contents in the container main body, so that the contents can be prevented to the maximum extent from flowing out by accident.

6. The contents merely flow out from the outflow channel, and an anti-flowback component of the outflow channel and the one-way valve of the removal channel can prevent the contents polluted by accident in the outflow channel from mixing with the contents in the container main body, and prevent further loss.

7. The container can be directly used without the need of mounting the pressurizing component before use.

Obviously, the pressure transmission channel in the container also has the following functions: 1. the pressure transmission channel can transmit pressure as required, so that pressure transmission is affected by a channel shape as few as possible, and the channel can be designed freely according to a shape of the container; 2. a start point of movement of the pressure transmission medium can be fixed, so that measurement of the volume of removed contents becomes simpler, and if a start point and a movement reference need to be set additionally during measurement of the outflow volume of the outflow channel, the structure is more complicated; 3. the pressure transmission channel is generally located on an upper wall or a side wall of the container, so that a user can read the volume scales marked on the pressure transmission channel more conveniently.

Likewise, the pressure channel in the container is a channel having an internal pressure changing periodically along with a removing process of the contents. During pressurized removal, pressure inside the pressure channel is increased, and the contents in the channel flow out under the pressure; after the removal, because of the pressurizing component, negative pressure is generated in the pressure channel, so that the contents in the container main body enter the pressure channel from the removal channel, pressure balance is achieved, and the container is ready for the next removal.

As for the container, a piston may be disposed in the pressure transmission channel, one side of the piston is the pressure transmission medium, and the other side of the piston is the contents. The piston can move to transmit the pressure, and also can separate the pressure transmission medium from the contents, thereby preventing pollution caused by mixing.

As for the container, the pressure transmission channel may be arc-shaped, and located on an upper wall of the container main body. The arc-shaped pressure transmission channel may also make the pressure transmission channel be thinner and longer, so that the removal is preciser, simpler, and more convenient. The pressure transmission channel located on the upper wall of the container main body facilitates more convenient reading.

Further, the pressurizing component may be a structure formed by connecting a piston and a pressurizing rod, and scales are marked on a container wall beside a pressurizing rod handle or on a support of the pressurizing rod, so as to mark the outflow volume or length of the contents when the pressurizing rod moves to this position during pressurization. The moving distance of the pressurizing rod is used to indicate the outflow volume of the contents, so that the moving operation is closer to a reading position, which is more in accord with operation habits. The pressurizing component located on the upper part facilitates more convenient operation and reading of scales for the user.

As for the container, the pressure transmission channel may be transparent, and volume scales are marked on an outer wall. Therefore, quantitative removal may be implemented.

As for the container, a part, marked with scales, of the pressure transmission channel may be located on the upper part of the container main body. The scales located at the upper part of the container main body facilitate more convenient observation during use.

As for the container, the pressure transmission channel may be located on the side wall and the upper part of the container main body, so as to also facilitate more convenient observation during use.

As for the container, the caliber of the pressure channel may be integrally consistent. The integrally consistent caliber of the pressure channel facilitates smoother flow of liquid and reduction of resistance.

As for the container, the pressure channel may have few turns with gentle angles, thereby facilitating smoother flow of liquid and reduction of resistance.

As for the container, the removal channel may be located on a bottom wall of the container main body. Therefore, costs can be reduced, and the last remaining contents can also be removed conveniently.

As for the container, a part of the wall of the container main body may be movable, so as to balance the pressure difference between the interior and exterior of the container by changing the volume of the container.

As for the container, the pressurizing component may be located on a handle that can be used for lifting the container, thereby facilitating operation of the user by a single hand.

As for the container, a joint of the pressurizing component and the pressure transmission channel may be higher than an outlet of the outflow channel.

As for the container, the pressurizing component may push a piston in the pressure transmission channel and a pressurizing rod, and a rod connected to the piston extends to the outside of the pressure transmission channel. Pressurizing the piston by using the rod is more direct and is labor saving.

As for the container, the pressurizing component may be a structure formed by connecting a piston and a pressurizing rod, and scales are marked on a container wall beside a pressurizing rod handle or on a support, so as to mark the outflow volume or length of the contents when the pressurizing rod moves to this position during pressurization. The moving distance of the pressurizing rod is used to indicate the outflow volume of the contents, so that the moving operation is closer to reading, which is more in accord with operation habits. The pressurizing component located on the upper part facilitates reading of scales for the user.

As for the container, the pressurizing component may be a bladder having a rebounding function, and an opening of the bladder is in communication with a pressurizing end of the pressure transmission channel. By means of the bladder having a rebounding function, the bladder rebounds automatically after being pressurized, so as to generate negative pressure, so that the contents in the container main body enter the pressure channel, and the container can perform the second removal immediately.

Further, a piston may be disposed in the pressure transmission channel of the container, one side of the piston is a pressurizing medium, and the other side of the piston is the pressure transmission medium. The piston can separate the pressurizing medium from the pressure transmission medium, and can mark the volume of the removed contents.

Further, the pressurizing medium of the container is liquid. The liquid medium is incompressible, so that it can well transmit the pressure, and the removed volume of the contents can be represented by the moving volume of the pressurizing medium.

Further, the pressure transmission medium of the container may be the contents in the container, thereby preventing another type of pressure transmission medium from polluting the contents.

Further, the density of the pressurizing medium in the pressurizing component of the container may be less than the density of the pressure transmission medium in the pressure transmission channel. The pressurizing medium is located at the upper part, and the small density of the pressurizing medium prevents the two from mixing together.

For the container whose pressurizing component is the bladder, the bladder may be provided with two ends, where one end is provided with a channel in communication with the pressure transmission channel, the other end is provided with an air channel in communication with the external air, and the air channel is provided with a one-way valve that can open outwards and a valve that can close the air channel. Therefore, by operating the bladder and the valves disposed thereon, a liquid level of the contents in the pressure transmission channel or the piston in the pressure transmission channel is located at an initial set position, thereby facilitating quantitative removal.

Further, a valve that can close the channel is disposed at the channel of the bladder in communication with the pressure transmission channel. The valve facilitates more convenient positioning of the liquid level or piston.

The container having the pressurizing component also overcomes various problems of the container in the prior art, and has the advantages such as material saving, leakage prevention, convenient use, recycled utilization, simple removal, being not easy to damage, good reproducibility, product pollution free, contents saving, precise removal, simple structure, strong practicability, and wide-range application. Moreover, the container has a large capacity, and can be recycled, so that application of various packages such as plastic is reduced, thereby facilitating alleviation of environmental pollution pressure.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Embodiment 1

Figure 1:
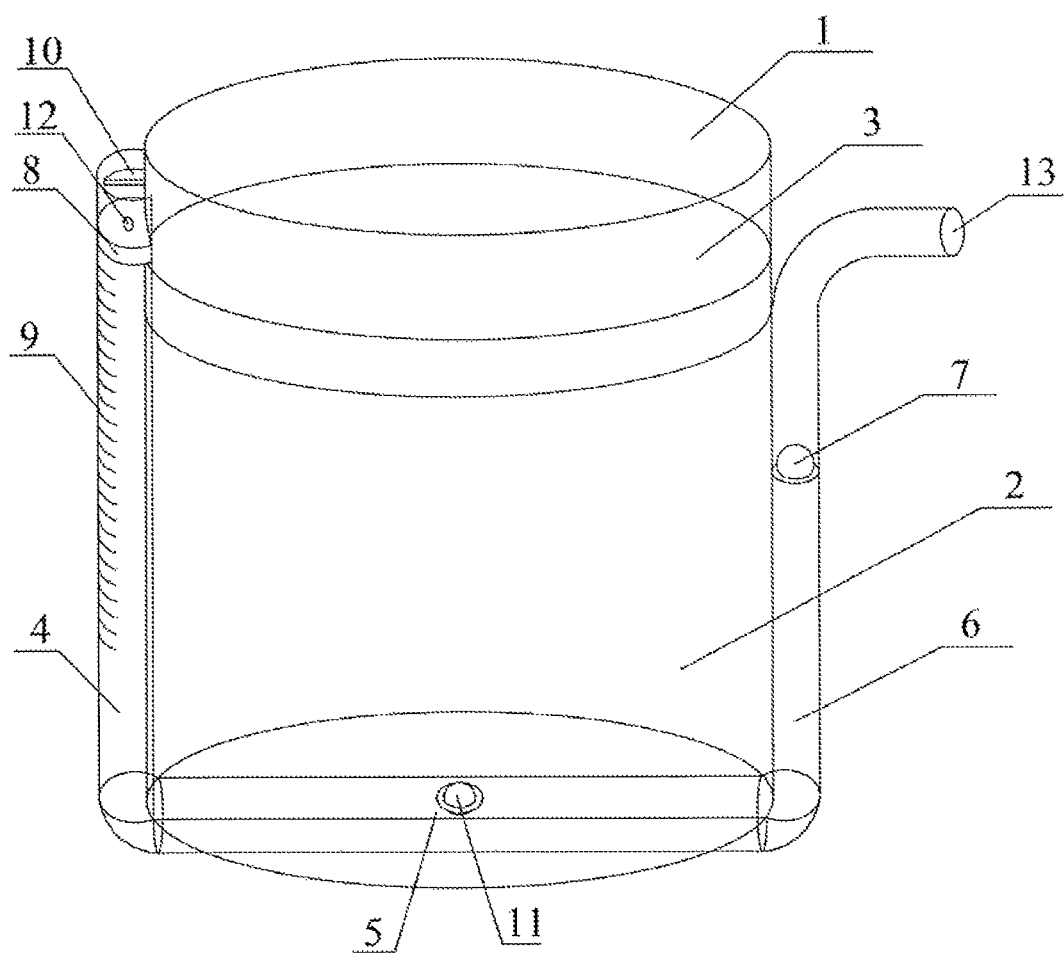
FIG. 1 is a schematic structural diagram of a container according to Embodiment 1.

FIG. 1 shows a container according to Embodiment 1 of the present invention. A main body part 1 of the container is cylindrical and contains liquid contents 2, a piston 3 is located above the liquid contents, and the piston 3 can move vertically in the main body part 1. A pressure channel is disposed on a side wall of the main body part 1. The pressure channel is composed of a pressure transmission channel 4, a removal channel 5 and an outflow channel 6 connected in series, and is attached to the side wall and a bottom wall of the main body part.

The pressure transmission channel 4 is made of a transparent material, and has scales 9 marked. A piston 8 is disposed at an upper port of the pressure transmission channel 4, the piston 8 can move downwards along the pressure transmission channel 4, and a protrusion 10 stops the piston 8 from moving upwards. The piston 8 is provided with a screw hole 12 for connecting a pressurizing rod.

The removal channel 5 is provided with a one-way valve 11, and the one-way valve 11 allows the liquid in the main body part 1 of the container to enter the pressure channel, and prevents the liquid in the pressure channel form entering the container main body 1. The one-way valve 11 is located on the bottom wall, and opens at the lowest position in the container.

An opening of the outflow channel 6 is aligned to the position of a protrusion 10, and is provided with a one-way valve 7 therein, so as to prevent the contents in the outflow channel 6 from flowing back. A cover 13 is disposed at the opening of the outflow channel 6, the cover is opened before the contents are removed, and the cover is closed after the contents are removed.

The container has a simple structure, is convenient in production, and has relatively low production costs. The container has a regular shape, and is convenient in transportation of packages. After the pressurizing rod is mounted on the piston 8, the contents in the container can be removed conveniently. The volume of the contents driven by moving of the piston 8 is equal to the volume of contents flowing out from the outflow channel 6, so that the volume of the outflow contents may be read from change of scales of the piston 8 on the outflow channel 6. The piston 3 can move vertically, so that when the contents in the container main body 1 flow out, the piston 3 moves downwards under the atmospheric pressure. The external air cannot contact with the contents in the container main body 1 and the pressure channel, and therefore, no pollution to or oxidization of the contents will be caused.

Embodiment 2

Figure 2:
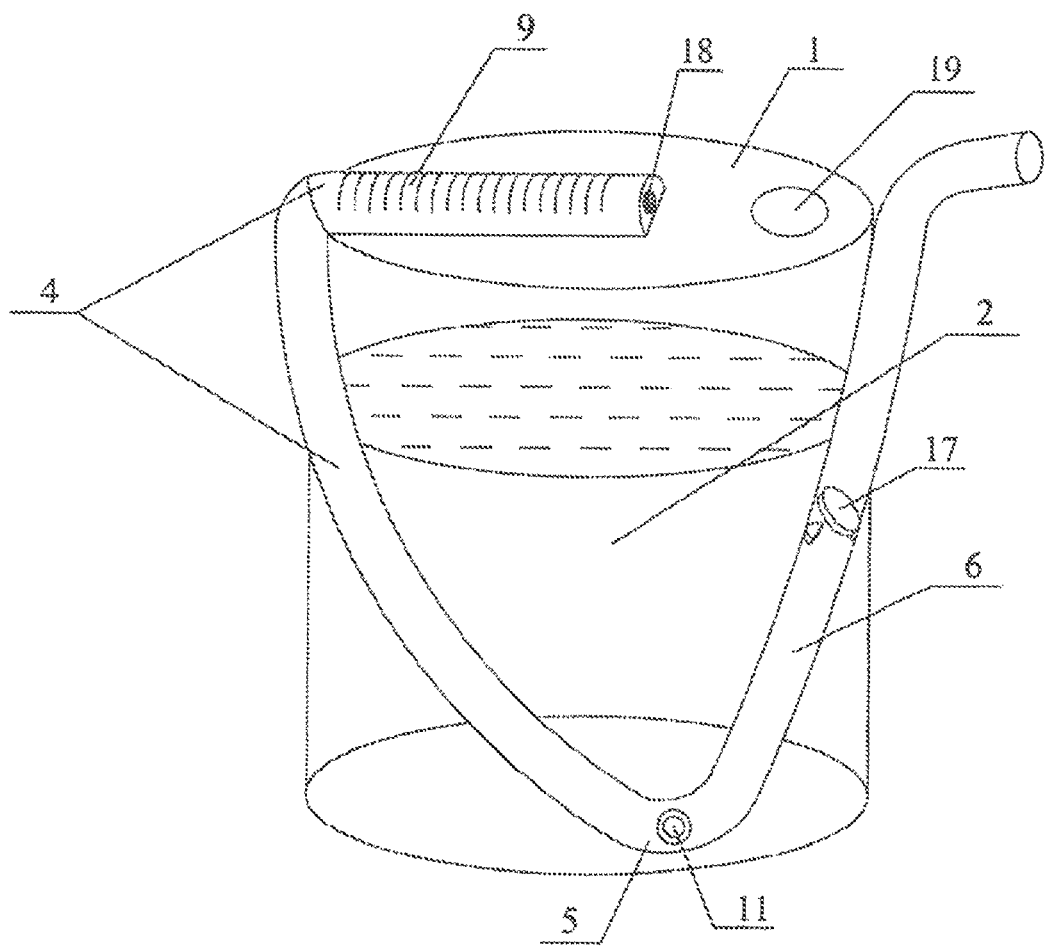
FIG. 2 is a schematic structural diagram of a container according to Embodiment 2.

FIG. 2 shows a container according to Embodiment 2. The container includes a container main body 1, an upper part of the container main body 1 is provided with a filling opening, and after filling of the contents 2, the filling opening is sealed by using a membrane 19 merely allowing small molecular gas to pass through.

The container further includes a pressure channel attached to an upper wall and a side wall of the container main body 1 in an inclined manner, the pressure channel is composed of a pressure transmission channel 4, a removal channel 5 and an outflow channel 6 connected in series, and the pressure channel is located on the same plane. A part of the pressure transmission channel 4 is located on the upper wall of the container main body 1, and a part of the pressure transmission channel is located on the side wall of the container main body 1. A one-way valve 11 on the removal channel 5 is located at the lowest end of the pressure channel, and opens at a lower part on the inside of the container main body.

The inside of the outflow channel 6 is provided with a sheet 17 preventing the contents from flowing back. The sheet 17 can rotate by a certain angle towards an outflow direction of the contents, and when the contents intend to flow back, the sheet 17 is perpendicular to a wall of the outflow channel 6, so as to block the outflow channel 6 and prevent the contents from flowing back.

A part of area, located on the upper wall and the side wall of the container main body 1, of the pressure transmission channel 4 is transparent, and the scales 9 are marked on the transparent area. At an opening of the pressure channel, that is, an opening of the pressure transmission channel 4, a thread 18 is provided, and the thread 18 can be connected to a pressurizing component externally provided, for example, a pressurizing airbag.

The container also has a simple structure, is convenient in production, and has relatively low production costs. The container has a regular shape, and is convenient in transportation of packages. The pressurizing airbag is mounted at the thread 18, so that the contents can be removed quantitatively and conveniently. Moreover, the airbag has a recovery function, and therefore, after each pressurized removal, the airbag rebounds, and the contents in the container main body 1 enter the pressure channel under the negative pressure in the pressure channel. The membrane 19 can allow air to pass through; therefore, after the contents in the container main body 1 enter the pressure channel, the air enters the container main body 1 from the membrane 19, the internal pressure and the external pressure are balanced, and the container is ready for the next removal.

Embodiment 3

Figure 3:
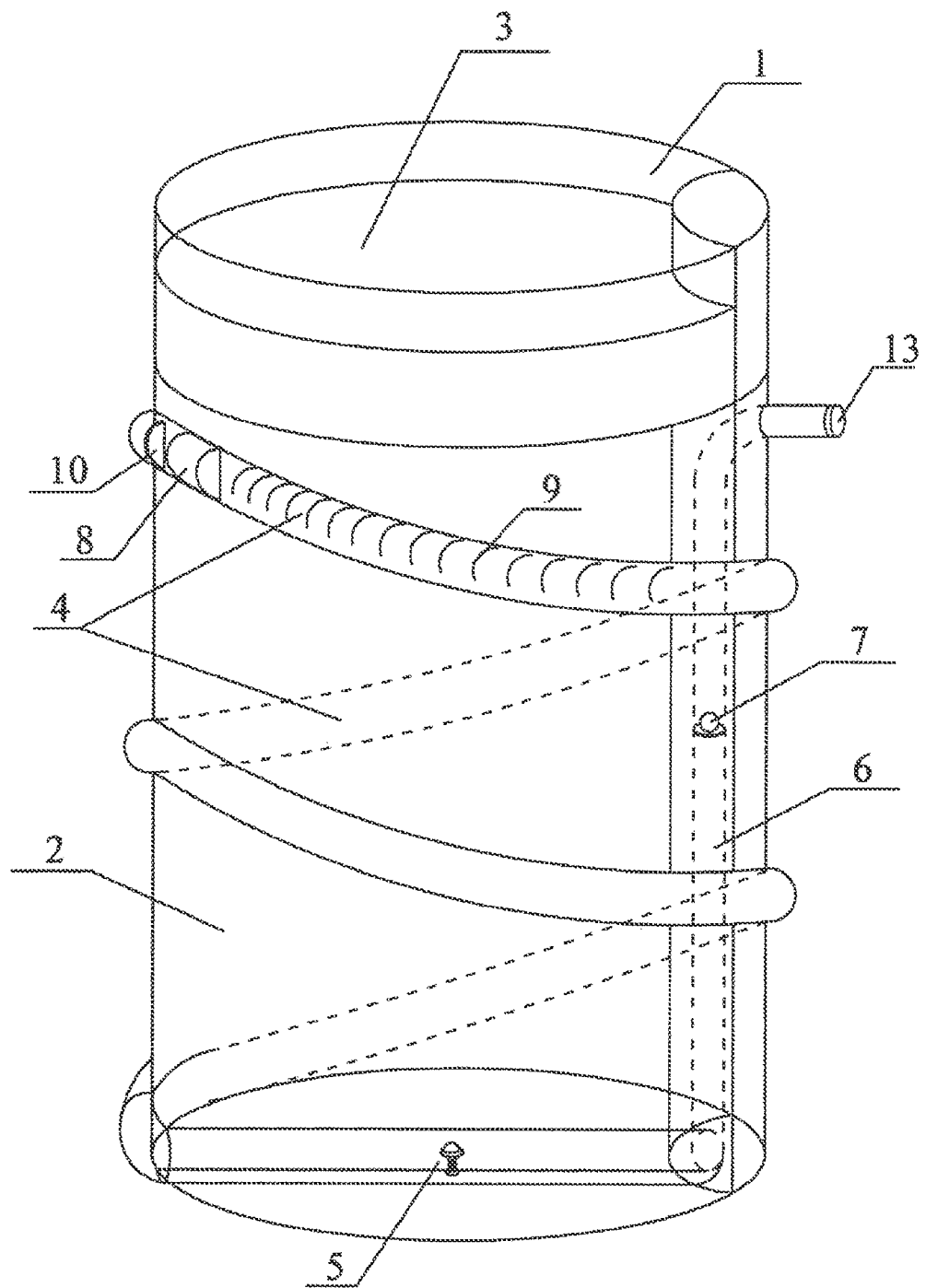
FIG. 3 is a schematic structural diagram of a container according to Embodiment 3.
Figure 4:
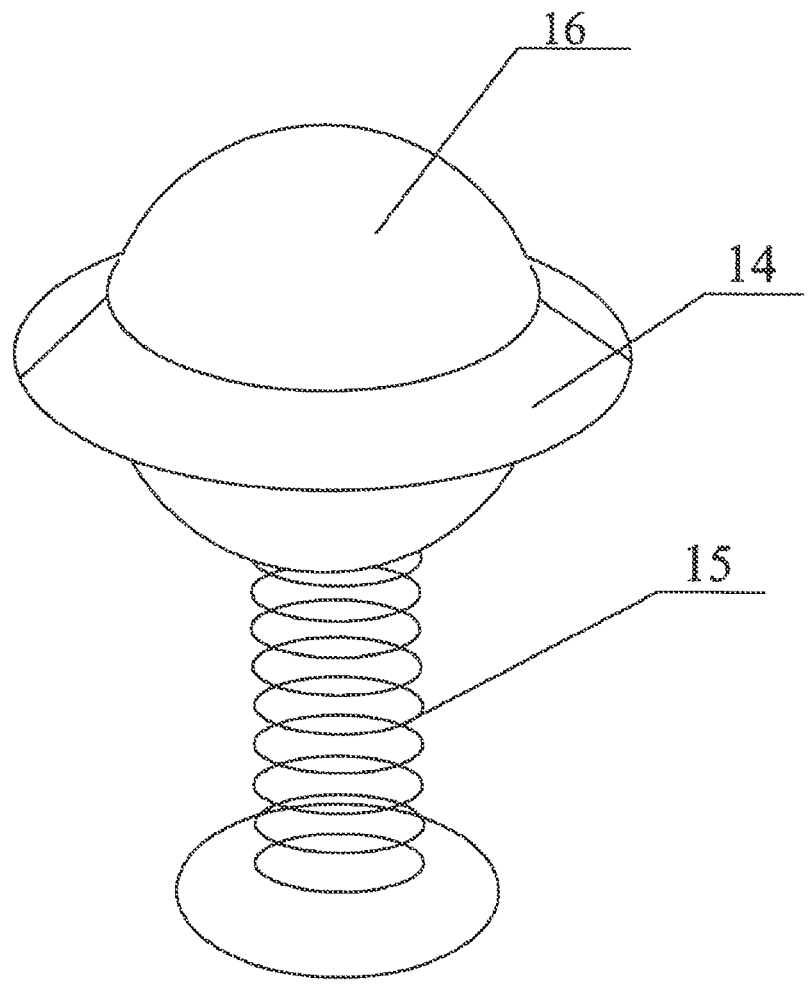
FIG. 4 is an enlarged diagram of a one-way valve in a removal channel in Embodiment 3.

FIG. 3 and FIG. 4 show a container for containing contents according to Embodiment 3, and FIG. 4 is an enlarged diagram of a one-way valve. A main body part 1 of the container is cylindrical and contains liquid contents 2, a piston 3 is located above the liquid contents, and the piston 3 can move vertically in the main body part 1. A pressure channel is disposed on a side wall of the main body part 1. The pressure channel is composed of a pressure transmission channel 4, a removal channel 5 and an outflow channel 6 connected in series, and is attached to the side wall and a bottom wall of the main body part. The pressure transmission channel 4 is spirally attached to an outer wall of the main body part, the outflow channel 6 is attached to an inner wall of the main body part, and an opening of the outflow channel 6 is located outside the container.

The pressure transmission channel 4 is made of a transparent material, and has scales 9 marked. A piston 8 is disposed at an upper port of the pressure transmission channel 4, the piston 8 can move downwards spirally along the pressure transmission channel 4, and a protrusion 10 stops the piston 8 from moving upwards. The piston 8 is provided with a screw hole 12 for connecting a spiral pressurizing rod.

The removal channel 5 is provided with a one-way valve, and the valve is composed of a ball 16, a trumpet-shaped channel 14 and a spring 15. The valve allows liquid in the main body part 1 of the container to enter the pressure channel, and prevents liquid in the pressure channel from entering the container main body 1. The one-way valve is located on a bottom wall, and the one-way valve opens at the lowest part on the inside of the container.

An opening of the outflow channel 6 is aligned to the position of the protrusion 10, and is provided with a one-way valve 7 therein, so as to prevent the contents in the outflow channel 6 from flowing back. A cover 13 is disposed at the opening of the outflow channel 6, the cover is opened before the contents are removed, and the cover is closed after the contents are removed.

After the pressurizing rod is mounted on the piston 8 of the container, according to the principle of liquid pressure transmission, the contents in the container can be removed simply and conveniently. The pressure transmission channel 4 is long, and contents of large volume can be removed precisely. The volume of the contents driven by moving of the piston 8 is equal to the volume of contents flowing out from the outflow channel 6, so that the volume of the outflow contents may be read from change of scales of the piston 8 on the outflow channel 6. The piston 3 can move vertically, so that when the contents in the container main body 1 flow out, the piston 3 moves downwards under the atmospheric pressure. The external air cannot contact with the contents in the container main body 1 and the pressure channel, and therefore, no pollution to or oxidization of the contents will be caused.

Embodiment 4

Figure 5:
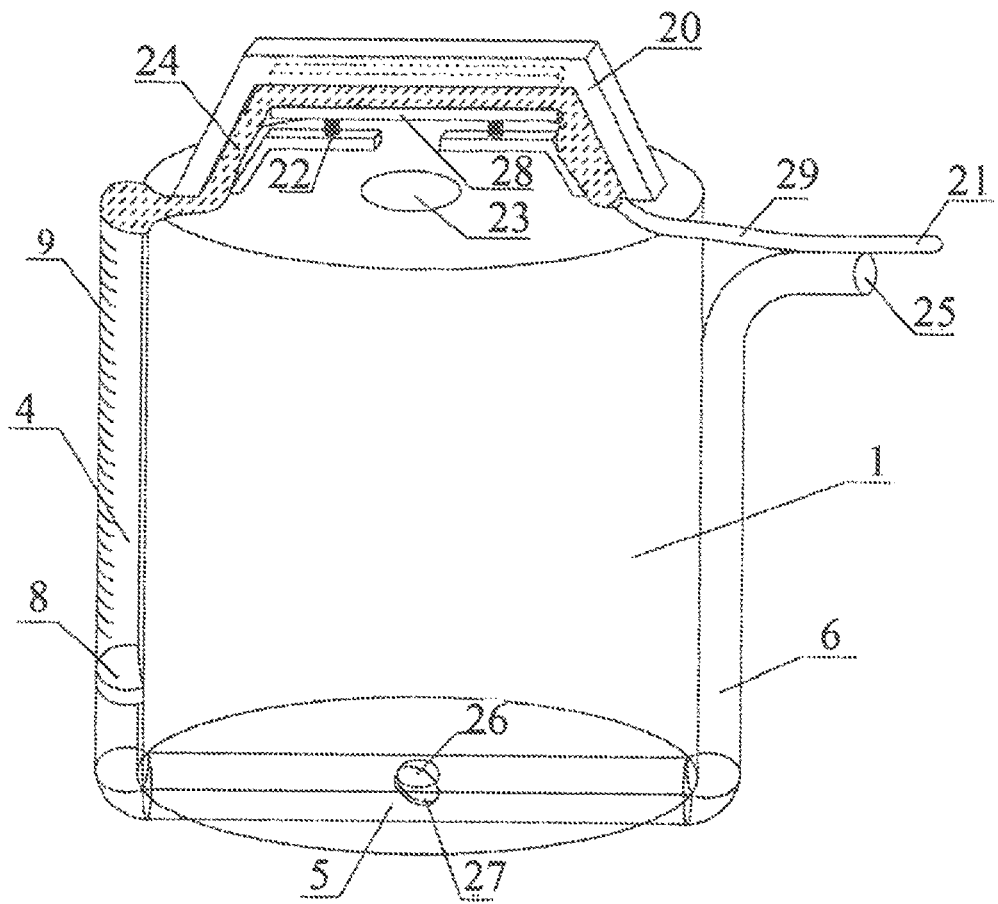
FIG. 5 is a schematic structural diagram of a container according to Embodiment 4.

FIG. 5 shows a container according to Embodiment 4. The container includes a container main body 1, contains contents, and is provided with an opening 23 at the top. A handle 20 is mounted at an upper part of the container main body 1. An elongated airbag 24 is disposed inside the handle 20. The airbag 24 is located between the handle 20 and a pressing plate 28, and when a user lifts the handle 20 and presses the pressing plate 28 by using a finger, air in the airbag 24 can be squeezed out, so as to pressurize the pressure channel and the like in communication with the airbag. A spring 22 is further disposed between the handle 20 and the pressing plate 28. After the removal is completed and the pressurization is stopped, the pressing plate 28 returns to the original position under the function of the spring 22, so as to drive the airbag 24 to recover. The airbag 24 merely has two openings: one is big and the other one is small. The big opening is connected to the end of the pressure transmission channel of the pressure channel 13. The small opening of the airbag 24 is in communication with an air passage 29, and the air passage 29 is in communication with an air pocket 21 having only one opening. The air pocket 21 has a magnetic material and attracts an outlet 25. The air pocket 21 is located at an upper part of the outlet 25 of the outflow channel 6. During pressurization, the air pocket 21 is inflated to spread, the outlet 25 of the outflow channel 6 is open; and after the pressurization is stopped, the airbag rebounds to generate negative pressure, the air pocket 21 is exhausted and sags, so as to block the outlet 25 of the outflow channel 6 to prevent the liquid in the outflow channel 6 from flowing back.

The pressure channel is composed of a pressure transmission channel 4, a removal channel 5 and the outflow channel 6 connected in series. The pressure transmission channel 4 is located on a side wall and a bottom wall of the container main body 1, the removal channel 5 is located on the bottom wall of the container main body 1, and a main body part of the outflow channel 6 is located on the side wall and the bottom wall of the container main body 1.

Liquid is placed in the pressure transmission channel 4, and scales marked downwards are provided at a joint of the airbag 24, and when pressurization is not performed, the height of the liquid level is located at a zero scale. A piston 8 is disposed at a lower part of the pressure transmission channel 4, and the piston 8 can move inside the pressure transmission channel 4, and separate the liquid in the pressure transmission channel 4 from the contents in the removal channel 5.

The removal channel 5 has a valve 27. The length of the valve 27 is greater than the length of an opening 26, and can totally seal the opening 26. The valve 27 can rotate downwards by 30 degrees.

During removal of the contents, a user lifts the handle 20 of the container, aligns the outlet 25 to a feeding place, and presses the pressing plate 28, and the airbag 24 pressurizes the two openings: one is big and the other is small. The air pocket 21 in communication with the small opening is inflated to be straightened, and the outlet 25 of the outflow channel 6 opens; the pressure transmission channel 4 in communication with the big opening is pressurized, so that the liquid therein moves downwards to push the piston 8 to move. The valve 27 rotates upwards under the pressure caused by moving of the contents, until the opening 26 closes. The contents in the pressure channel flow out along the outflow channel 6 under the pressure transmitted by the pressure transmission channel 4.

After the contents are removed, the user stops pressurizing, the pressing plate 28 rebounds under the function of the spring 22, and the airbag 24 recovers to generate negative pressure. The air pocket 21 is exhausted and sags. The negative pressure is generated in the pressure channel, and the air pocket 21 is closely attached to the outlet 25, so as to prevent the contents in the outflow channel 6 from flowing back. The valve 27 rotates downwards, the opening 26 opens, and the contents in the container main body 1 enter the pressure channel. The liquid in the pressure transmission channel 4 moves upwards under the negative pressure, the piston 8 moves leftwards and upwards to recover, and the pressure channel outside the pressure transmission liquid is filled with the contents in the container main body 1. The external air enters the container main body 1 through the opening 23, the internal pressure and the external pressure are balanced, and the container is ready for the next removal.

Embodiment 5

Figure 6:
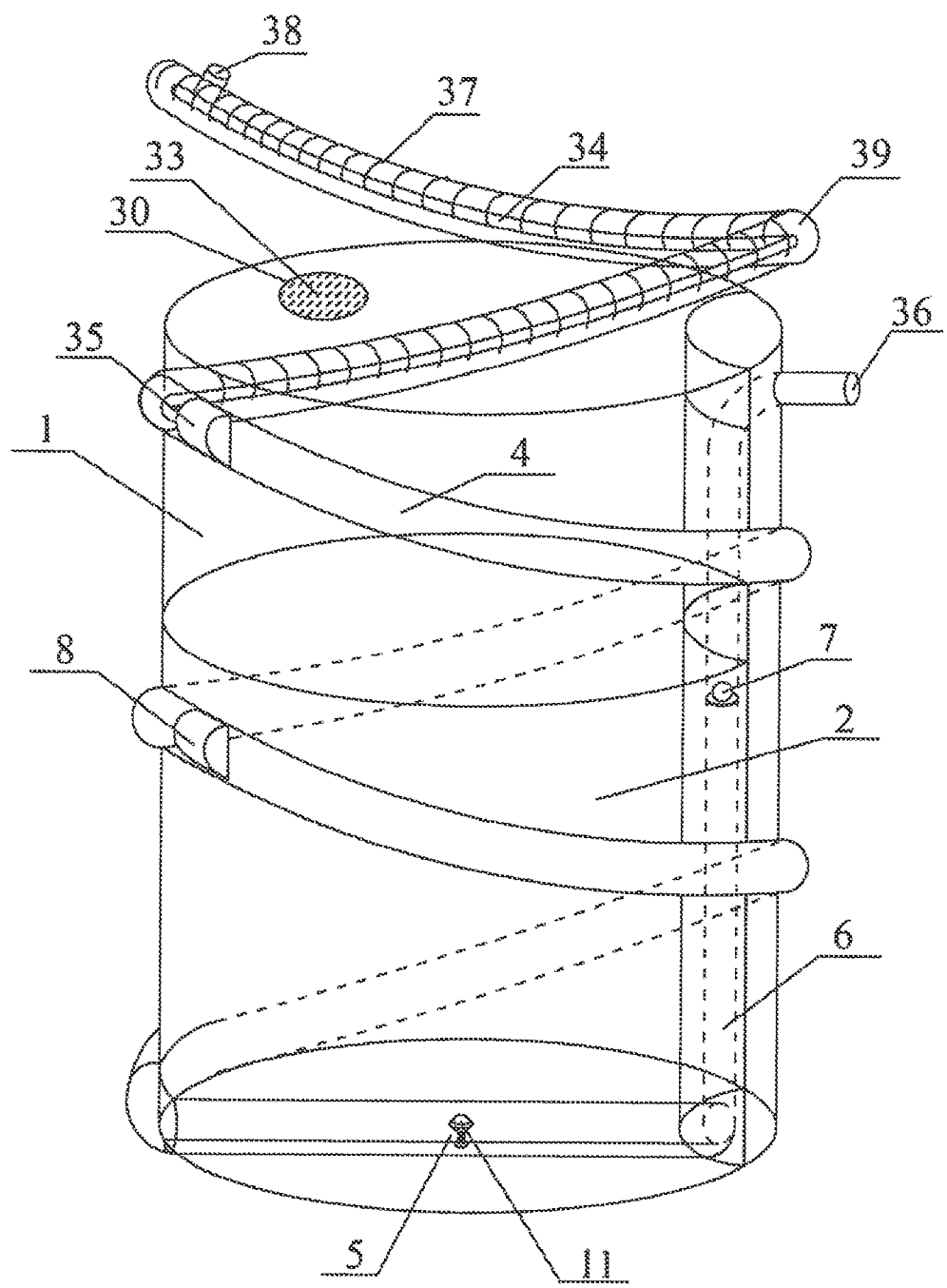
FIG. 6 is a schematic structural diagram of a container according to Embodiment 5.

FIG. 6 shows a container according to Embodiment 5. The container includes a container main body 1, and is provided with an opening 30 at the top. The container main body 1 is cylindrical, and after the container main body is filled with contents 2, the opening 30 is sealed by using a one-way valve 33 merely allowing air to enter. The one-way valve 33 opens when the air pressure in the container main body 1 is less than the external pressure.

A steel wire 34 is coiled at an upper part of the container main body 1 spirally, and a lower end of the steel wire 34 is fixedly connected to a piston 35 at a start end of a pressure transmission channel 4. The upmost end of the steel wire 34 is connected to a button 38 which facilitates pressing for pressurization. The steel wire 34 is wrapped by a support frame 39 for supporting. The support frame 39 has scales 37 marked from the upmost position where the button 38 is located, so as to indicate the volume of outflow contents when the button 38 moves to this position.

A pressure channel is composed of the pressure transmission channel 4, a removal channel 5 and an outflow channel 6 connected in series, and the pressure therein changes along with upwards or downwards rotation of the steel wire 34.

The pressure transmission channel 4 is coiled on an outer wall of the container main body 1 spirally, the radius of the spiral and the turn interval thereof are the same as those of the steel wire 34, and the number of turns thereof is twice as much as that of the steel wire 34. A piston 8 is disposed in the middle of the pressure transmission channel 4. A liquid pressure transmission medium is located between the piston 35 and the piston 8.

The removal channel 5 is located on a bottom wall of the container main body 1, and is provided with a one-way valve 11 at the top and in communication with the interior of the container main body 1. The one-way valve 11 allows the contents 2 in the container main body 1 to enter the pressure channel.

A main body of the outflow channel 6 is located on an inner wall of the container main body 1, and a one-way valve 7 preventing the contents from flowing back is disposed inside the outflow channel. A terminal of the outflow channel 6 passes through the wall of the container main body 1, and an outlet 36 is located outside the container main body 1.

During removal of the contents, a user presses the button 38 on the steel wire 34 to pressurize the pressure channel, the pistons 35 and 8 move downwards, the one-way valve 11 closes, the one-way valve 7 opens, and the contents in the pressure channel flow out. When the button 38 reaches a designated scale position, the user stops pressurizing; at this time, the volume of the outflow contents is the marked volume.

After the removal of the contents, the user moves the button 38 spirally upwards, the steel wire 34 drives the piston 35 to move upwards, the piston 8 moves upwards, the one-way valve 7 closes, the one-way valve 11 opens, and the contents in the container main body 1 enter the pressure channel between the piston 8 and the one-way valve 7 and the pressure channel is full of the contents. The pressure in the container main body 1 is reduced, the external air enters the container main body 1 from the one-way valve 33, and the internal pressure and the external pressure are balanced. In this case, the next removal can be performed.

Embodiment 6

Figure 7:
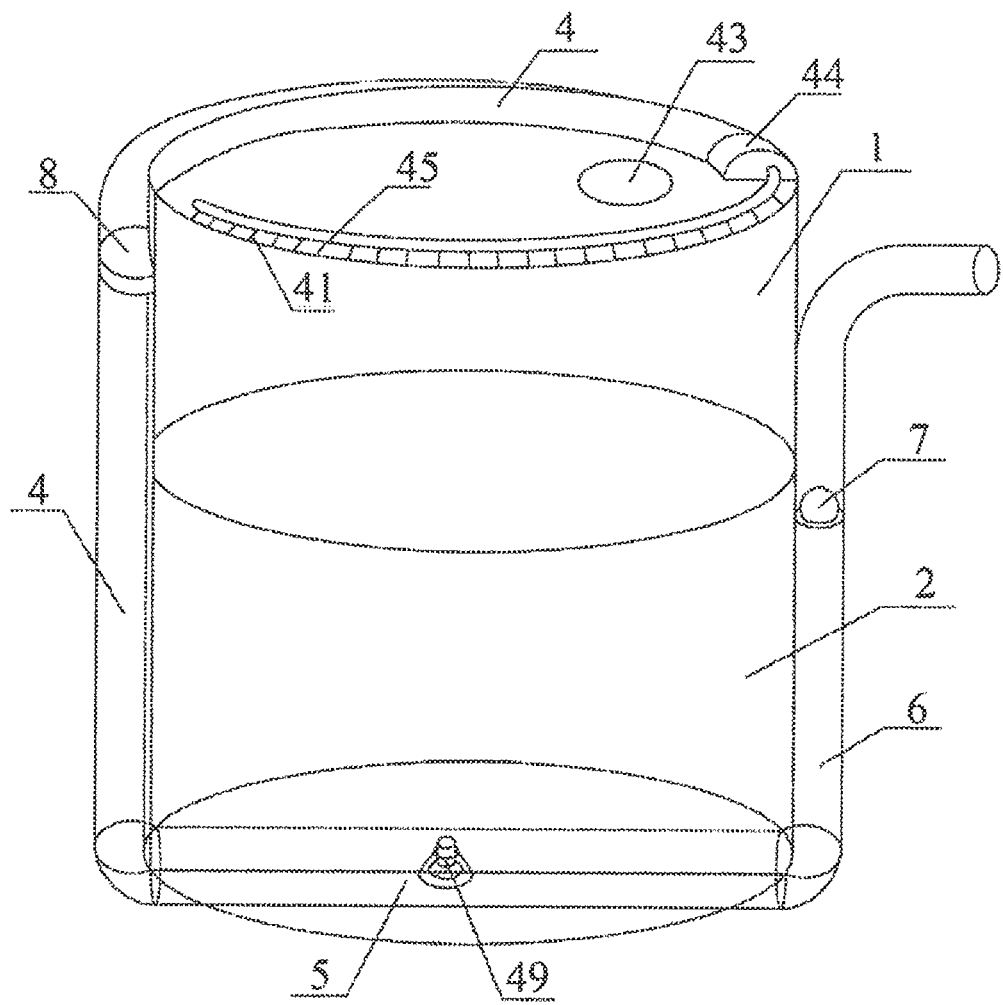
FIG. 7 is a schematic structural diagram of a container according to Embodiment 6.
Figure 8:
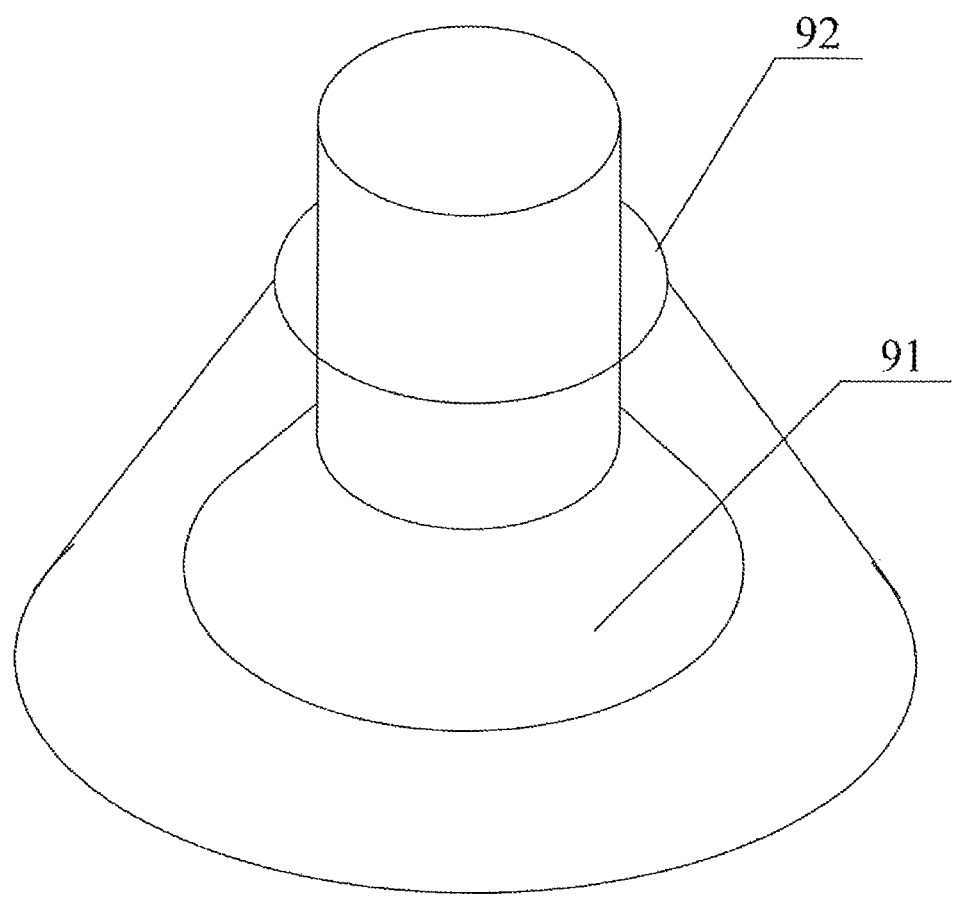
FIG. 8 is an enlarged diagram of a one-way valve 9 in FIG. 7.

FIG. 7 shows a container according to Embodiment 6, and FIG. 8 is an enlarged diagram of a one-way valve 49 in FIG. 7. The container includes a container main body 1, and is provided with an opening 43, at the top. Contents 2 are contained in the container main body 1.

A pressurizing component is composed of a piston 44 and a pressurizing rod 45, the piston 44 is located in a pressure transmission channel 4, and is located at a start end of the pressure transmission channel 4 when pressurization is not performed. The pressurizing rod 45 is arc-shaped, and is horizontally located on an upper wall of the container main body 1. Scales 41 are marked on the upper wall of the container main body 1 adjacent to the pressurizing rod 45, so as to indicate the volume of outflow contents when the start end of the pressurizing rod 45 moves to this position.

A pressure channel is composed of the pressure transmission channel 4, a removal channel 5 and an outflow channel 6 connected in series, and a main body of the pressure channel is located on the wall of the container main body. The pressure in the pressure channel changes along with different rotation directions of the pressurizing rod 45.

The pressure transmission channel 4 has an arc-shaped upper part, is located on the upper wall of the container main body 1, and is located on a same plane with the pressurizing rod 45. The lower part of the pressure transmission channel 4 is located on a side wall and a bottom wall of the container main body. A pressure transmission medium between the piston 44 and the piston 8 in the pressure transmission channel 4 is liquid. A pressure transmission medium between the piston 8 and the removal channel 5 is the contents. The removal channel 5 is located on the bottom wall of the container main body 1, and has a one-way valve 49 opening inside the container main body 1. The one-way valve 49 includes a nail-shaped plug 91 and a bellmouth 92. The bellmouth 92 opens inside the container main body 1. The outflow channel 6 is provided with a one-way valve 7 therein.

If it intends to remove contents of certain volume, first fill all space below the piston 8 in the pressure channel with the contents (the space has been filled after the previous removal), and the pressurizing rod 45 then rotates, so that an end of the pressurizing rod moves to the designated volume scale. During moving of the pressurizing rod 45, the piston 44 and the piston 8 move together, the one-way valve 49 closes, the one-way valve 7 opens, and the volume of the contents flowing out from the outflow channel 6 is the designated volume.

After the contents of the required volume is removed, the pressurizing rod 45 returns to the original position, the piston 44 and the piston 8 recover, the one-way valve 7 closes, the one-way valve 49 opens, the contents 2 in the container main body 1 enter the pressure channel, and the external air enters the container main body 1 from the opening 43. The container is ready for the next removal.

Although the embodiments of the present invention are shown and described, a person of ordinary skill in the art may make various changes, modifications, replacements, variations and combinations to the embodiments without departing from the principle and spirit of the present invention. The scope of the present invention is defined by the claims and equivalents thereof.

What is claimed is:

1. A container, comprising a container main body, wherein the container further comprises:
    a pressure channel composed of a pressure transmission channel, a removal channel and an outflow channel connected in series;
    a main body of the pressure transmission channel is attached to a wall of the container main body and has one end in communication with the removal channel and the other end connectable to a pressurizing component provided externally;
    wherein the pressure transmission channel transmits pressure exerted on the inside of the pressure transmission channel by the pressurizing component provided externally, via a pressure transmission medium inside the pressure transmission channel;
    wherein the pressure transmission channel is transparent, and an upper wall of the container main body has volume scales marked thereon;
    wherein a wall of the removal channel is provided with a one-way valve allowing the contents in the container main body to flow into the pressure channel, and the one-way valve opens at the bottom on the inside of the container main body; and
    wherein the outflow channel is a channel that is used for the contents to flow out of the container and able to prevent the contents from flowing back.

2. The container according to claim 1, wherein a horizontal position of a connection joint of the pressure transmission channel and the pressurizing component provided externally is higher than a full-load liquid level of the contents in the container main body.

3. The container according to claim 1, wherein a part of the pressure transmission channel is arc-shaped, and is located on the upper wall of the container main body.

4. A container, comprising a container main body, wherein the container further comprises:
    a pressurizing component; and
    a pressure channel composed of a pressure transmission channel, a removal channel and an outflow channel connected in series;
    wherein a main body of the pressure transmission channel is attached to a wall of the container main body and has one end in communication with the removal channel and the other end connectable to the pressurizing component;
    wherein the pressure transmission channel transmits pressure exerted on the inside of the pressure transmission channel by the pressurizing component, via a pressure transmission medium inside the pressure transmission channel;
    wherein the pressure transmission channel is transparent, and an upper wall of the container main body has volume scales marked thereon;
    wherein a wall of the removal channel is provided with a one-way valve allowing contents in the container main body to flow into the pressure channel, and the one-way valve opens at the bottom on the inside of the container main body; and
    wherein the outflow channel is a channel that is used for the contents to flow out of the container and able to prevent the contents from flowing back.

5. The container according to claim 4, wherein a piston is disposed in the pressure channel, one side of the piston is the pressure transmission medium, and the other side of the piston is the contents.

6. The container according to claim 4, wherein a part of the wall of the container main body is movable.

7. The container according to claim 4, wherein the pressurizing component is a structure formed by connecting a piston and a pressurizing rod, and scales are marked on said upper wall beside a pressurizing rod handle or on a support of the pressurizing rod, so as to mark the outflow volume or length of the contents when the pressurizing rod moves during pressurization.

8. The container according to claim 4, wherein the pressurizing component comprises the piston in the pressure transmission channel and a pressurizing rod, and a rod connected to the piston extends outside the pressure transmission channel.

9. The container according to claim 8, wherein scales are marked on said upper wall beside a pressurizing rod handle or on a support of the pressurizing rod, so as to mark the outflow volume or length of the contents when the pressurizing rod moves during pressurization.

\* \* \* \* \*